May 22, 1934.                G. R. HAUB                1,959,672
SEVERING MECHANISM FOR GLASS FEEDERS
Filed March 1, 1932
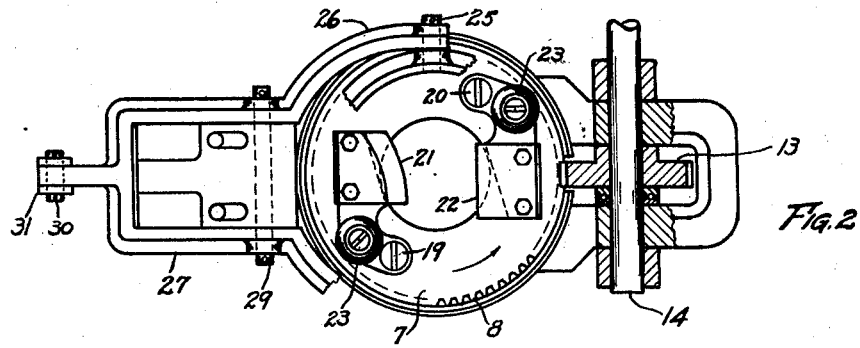
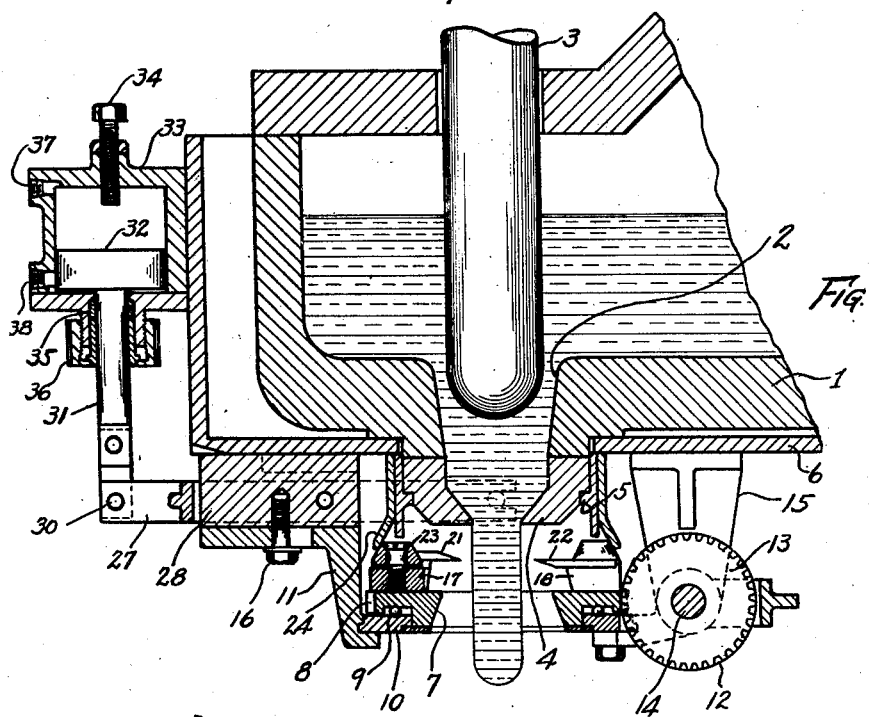
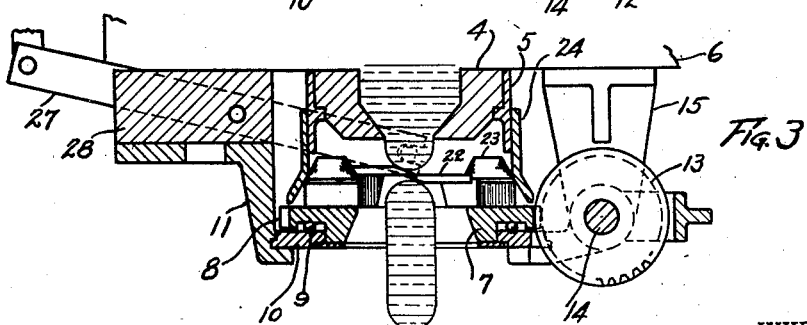
INVENTOR
George R. Haub
BY William B. Jaspert
ATTORNEY Patented May 22, 1934

1,959,672

UNITED STATES PATENT OFFICE 1,959,672

SEVERING MECHANISM FOR GLASS FEEDERS

George R. Haub, Crafton, Pa., assignor to Shawkee Manufacturing Company, Pittsburgh, Pa., a corporation of Pennsylvania Application March 1, 1932, Serial No. 595,985

6 Claims. (Cl. 49—14)

This invention relates to improvements in apparatus for severing glass gobs or mold charges from a pool of molten glass, and it is among the objects thereof to provide shearing mechanism in which the cutting members are revolved around the glass being severed to produce a uniform cutting action throughout the cross sectional area of the glass mass.

The primary object of the invention is the provision of glass severing mechanism which shall eliminate the shearing scar produced in the finished glass article by the conventional type of glass severing mechanism heretofore in use.

A further object of the invention is the provision of simple and efficient means for controlling the shearing knives of the shearing mechanism to render them operative periodically in accordance with a positively controlled actuating device, and it is a further object of the invention to provide rotary glass shearing mechanism of the above designated character which shall be constructed in a manner to render all of its parts accessible for inspection, adjustment, or replacement without requiring that the entire device and its operating parts be dismembered.

These and other objects will become more apparent from a consideration of the accompanying drawing constituting a part hereof in which like reference characters designate like parts and in which:

Figure 1 is a cross sectional view of a feeder boot and revolving shear mechanism embodying the principles of this invention;

Figure 2 a composite plan view of the revolving shears; and,

Figure 3 is a view illustrating the position of the cutting blades when the severing operation is completed.

With reference to the several figures of the drawing, the structure therein illustrated comprises a feeder boot generally designated by the reference character 1 having a submerged discharge orifice 2 in alinement with a feeder needle 3, the latter being adapted for reciprocatory movement to control the rate of feeding the glass through the discharge orifice 2.

An orifice ring 4 of refractory material is mounted below the discharge orifice 2 by a bushing or holder 5 which is hinged (not shown) to the supporting casting 6 of the feeder boot to permit swinging it out of place and to center the orifice ring 4 with the outlet orifice 2.

A cutter head 7 having a relatively large central opening and having gear teeth 8 on the outer periphery thereof is mounted for rotation on ball bearings 9 carried by a ball container 10 which is held by a clamping bracket 11 at one end and hinged to a power shaft at its other end.

The teeth 8 of the cutter head 7 coact with the teeth 12 of a gear wheel 13 which is actuated by a power shaft 14, the teeth 8 and 12 being 45 degree helix angles to constitute a right angle drive. The shaft 14 is journalled in a bracket 15 secured to the underside of the boot casting 6, and the shaft 14 also constitutes a hinge pin whereon the cutter head support 10 is adapted to pivot to drop the cutter head out of position by sliding the clamp 11 out of engagement when the cap bolt is loosened.

A pair of levers 17 and 18 are pivotally connected at 19 and 20 to the cutter head 7. Knives or blades 21 and 22 are securely fastened to the levers 17 and 18 and conical shaped rollers 23 are rotatably mounted on the levers 19 and 20. Rollers 23 are adapted to engage the inner track of a conical race 24 which is provided with trunnions 25 that engage the bifurcated ends 26 of a lever 27. The lever is pivoted to a block 28 by a pin 29 and is pivotally connected at 30 to a piston rod 31 which extends downwardly from piston 32 which is operatively disposed in a cylinder 33. An adjustable screw 34 is provided in the top of cylinder 33 to control the length of stroke of the piston 32 and the piston rod and cylinder is provided with a packing gland 35 that is adapted through a stuffing box 36 to seal the cylinder against leakage. Threaded connections 37 and 38 are adapted to receive conduits leading to a fluid pressure source whereby the piston is actuated in its cylinder to operate the bifurcated lever 27 thereby raising and lowering the conical track 24.

The operation of the above described rotary shear mechanism is briefly as follows:

Access of fluid pressure to cylinder 33 is controlled through valve mechanism (not shown) to actuate piston 32 in synchronism with the reciprocatory movement of the needle 3 so that when the desired quantity of glass is extruded from the orifice ring 4, the conical race 24 will be lowered into contact with the rollers 23 to force them radially inward in direction of the body of the glass. The power shaft 14 is operated at a fairly high speed to cause the cutter head 7 to revolve thus forcing levers 17 and 18 outwardly by centrifugal action to effect engagement of rollers 23 with the inner track of the conical race 24.

At the instant that the desired body of glass has been extruded, piston 32 is actuated to force the conical track 24 downwardly thus bringing the rotating knives in contact with the glass to produce a rotary cutting action which parts the glass without leaving a scar since the portion of the glass coming in contact with the cutting edges of the shear is instantly severed thus preventing cooling of the glass as in the conventional type of shears, and the resulting glass article will be free from the objectionable scar caused by chilling.

When the glass has been severed, the piston raises the conical track 24, and the cutting blades fly radially outward by centrifugal action to assume the position shown in Figure 1 of the drawing.

In Figure 3 the cutting action of the rotary shears is graphically illustrated by the curved ends of the severed parts of the glass which demonstrate that there is only momentary contact of the cutting blades with any portion of the glass as it is being severed.

In conventional types of shearing mechanism as heretofore employed, the shear blades were made to approach each other and since they did not revolve, they came in contact with the glass causing it to become chilled. The scar was caused by the action of the two shear blades breaking cold glass in the severing operation. This type of blade does not cut the glass when it initially contacts it as it pushes it ahead distorting the cross-section of the glass in doing so, and as the two shear blades come into action, the cold glass is broken or severed forming the objectionable scar. For this reason, large losses of glass articles occurred, which by employment of the rotary type of shears as herein disclosed, are eliminated.

Both of the elements 21 and 22 are herein illustrated and described as cutting members. However, I do not wish to limit my invention to the use of any particular number of cutting elements since it is apparent that one cutter may be employed in cooperation with a blunt element the latter functioning to aid in severing the final strand of the glass. Also, it is obvious that more than two cutting elements may be employed if desired.

I claim as my invention:

1. A rotary shear for severing glass comprising a cutter head having a cutting blade pivotally mounted thereon, a roller provided on said blade, and a movable conical track adapted to engage said roller whereby the blade is subjected to radial movement in the direction of the glass to be severed.

2. A rotary shear for severing glass comprising a cutter head, actuating mechanism for subjecting said head to rotary movement, a plurality of cutting blades mounted on said head and adapted for radial movement thereon, said cutters being normally held in a radially extended position by centrifugal force, rollers mounted on said blades and a cam track having a surface complementary to the shape of the roller surfaces to engage said rollers to gradually force the cutting blades radially inward into the body of the glass to be severed.

3. A rotary shear for severing glass comprising a cutter head adapted for rotary movement disposed below the orifice ring of a feeder boot, a lever pivoted on said cutter head and having a cutting blade mounted thereon, a roller mounted on said lever, a flared track for engaging said roller, means for moving said track into and out of contact with said roller whereby to effect radial displacement of the cutting blade to sever the glass extruded from the orifice ring.

4. A rotary shear for severing glass comprising a cutter head mounted for rotary movement below the orifice ring of a feeder boot, a power shaft for actuating said cutter head, a plurality of levers pivotally mounted on said cutter head having cutting blades extending radially inward and having rollers mounted thereon, a cam track for engaging said rollers, and means for bringing said track into contact with said rollers periodically to sever the glass in mold charges of predetermined weight.

5. A rotary shear for severing glass comprising a cutter head mounted for rotation on an antifriction bearing support and having helical gear teeth coacting with the teeth of a drive gear mounted on a power shaft, means for hinging said cutter head on said power shaft, a clamp for holding said cutter in its normal horizontal position, a plurality of levers mounted on the cutter head and adapted for swinging movement thereon, shear blades carried by said levers, and rollers journalled on the levers having conical faces, a cam track having a flared face for engagement with the rollers of said levers, and means for bringing said track into and out of engagement with the rollers whereby to cause the levers to be depressed radially inward to bring the shear blades in contact with the glass discharged from the feeder boot.

6. A rotary shear for severing glass comprising a cutter head adapted for rotary movement and disposed below the orifice ring of a feeder boot, actuating mechanism for rotating said head, a plurality of levers pivoted on said head, shear blades carried by said levers, and rollers journalled on said levers, said rollers having conical faces, a conical track for engagement with the faces of said rollers, said track being mounted on a lever, and actuating mechanism for said lever whereby said track is pressed into and out of engagement with the conical faced rollers to cause the blade supporting levers to move radially inward and outward to sever the glass discharged from the orifice ring of the feeder boot.

GEORGE R. HAUB.